US 3,723,389
Patented Mar. 27, 1973

3,723,389
THERMOPLASTIC AROMATIC
POLY(ETHER-SULFONES)
Ghazi Khattab, Parsippany, N.J., assignor to Allied
Chemical Corporation, New York, N.Y.
No Drawing. Filed Oct. 27, 1971, Ser. No. 193,195
Int. Cl. C08g 23/00, 25/00
U.S. Cl. 260—49     7 Claims

ABSTRACT OF THE DISCLOSURE

Polymeric condensation products of about equimolar amounts of p,p'-dihalodiphenyl sulfone with alkali metal bisphenates of the formula

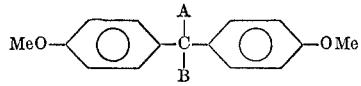

wherein Me is an alkali metal, A and B are hydrogen, alkyl, phenyl or alkali metal carboxylate substituted alkyl, at least one of A and B being alkali metal carboxylate substituted alkyl, or mixtures of the above alkali metal bisphenate with an alkali metal bisphenate of the same formula wherein Me is as stated above and A and B are hydrogen, alkyl or phenyl are resistant to attack by solvents and to environmental stress cracking.

BACKGROUND OF THE INVENTION

Aromatic poly(ether-sulfones) obtained by condensation of about equimolar amounts of p,p'-dihalodiphenyl sulfone of the formula

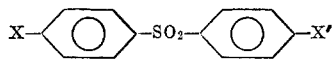

wherein X and X' are fluorine, chlorine, bromine or iodine with alkali metal bisphenates of the formula

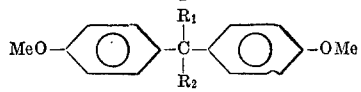

wherein Me is an alkali metal and wherein $R_1$ and $R_2$ are hydrogen, alkyl or phenyl radicals are known products [cf., e.g., R. N. Johnson et al., Poly(aryl Ethers) by Nucleophilic Aromatic Substitution, Journal of Polymer Science, Part A–1, vol. 5, p. 2375 (1967)]. These polymers are characterized by excellent thermal stability and chemical inertness. Aromatic condensation polymers obtained from p,p'-dihalodiphenyl sulfone and Bisphenol A, having a backbone chain of the formula

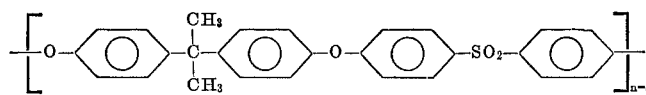

are commercialy available products. They are clear, rigid, tough thermoplastics with glass transition temperatures of 180° C. to 250° C. That high glass transition temperature in combination with excellent thermal stability and chemical inertness makes possible continuous use of products made therefrom at temperatures in the range of 150 to 200° C. Although their melting temperatures are high, their good thermal stability allows fabrication by usual thermoplastic processing operations to obtain fabricated articles. Such articles, unfortunately, are subject to attack by polar organic solvents such as ketones, chlorinated hydrocarbons and aromatic hydrocarbons which, if they fail to dissolve them, cause cracking under stress.

It is an object of the present invention to provide novel aromatic poly(ether-sulfones) having increased resistance to attack by solvents.

It is another object of the present invention to provide novel aromatic poly(ether-sulfones) having increased resistance to environmental stress cracking when contacted with solvents.

It is a further object to provide aromatic poly(ether-sulfone) resins combining high thermal stability, chemical inertness, resistance to attack by solvents and resistance to environmental stress cracking, and a method for their preparation.

SUMMARY OF THE INVENTION

In accordance with the present invention, there are provided aromatic poly(ether-sulfone) products which are the condensation products of about equimolar amounts of p,p'-dihalodiphenyl sulfone of the formula

(II)

wherein X and X' are halogens selected from the group consisting of fluorine, chlorine, bromine and iodine, with
    (a) An alkali metal bisphenate of the formula

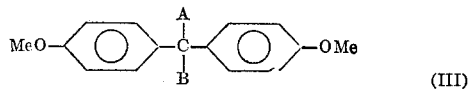
(III)

wherein Me is an alkali metal, and wherein A and B, which may be the same or different, are selected from the group consisting of
    (i) H;
    (ii) alkyl, straight chain or branched, having from 1 to 12 carbon atoms;
    (iii) phenyl;
    (iv) alkyl-substituted phenyl wherein the alkyl substituents may have from 1 to 6 carbon atoms; and
    (v) a group of the formula
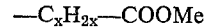
$$-C_xH_{2x}-COOMe$$

wherein $x$ is an integer of from 1 to 12 and Me is an alkali metal:

with the proviso that at least one of A and B is a group of the formula $C_xH_{2x}$—COOMe wherein $x$ and Me have the afore-stated meanings, or with (b) A mixture of said alkali metal bisphenate with an alkali metal bisphenate of the formula

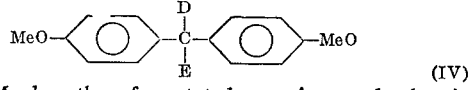
(IV)

wherein Me has the afore-stated meaning, and wherein D and E, which may be the same or different, are selected from the group consisting of
(i) H;
(ii) alkyl, straight chain or branched, having from 1 to 12 carbon atoms;
(iii) phenyl; and
(iv) alkyl-substituted phenyl wherein the alkyl substituents may have from 1 to 6 carbon atoms;

with the proviso that the alkali metal bisphenate of the

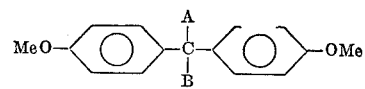

formula is present in said mixture in amount of at least 10 mol percent, based on the combined bisphenates in said mixture.

The aromatic sulfonated poly(ether-sulfone) products of the present invention are obtained by condensation polymerization of alkali metal salts of dihydric phenol having the Formula III, above, wherein A and B have the afore-stated meanings, or mixtures thereof with alkali metal salts of dihydric phenols of Formula IV, above, wherein D and E have the afore-stated meanings, and in which mixture the alkali metal salt of dihydric phenol of Formula III, above, must be present in amount of at least 10 mol percent, based on the total number of mols in the mixture, with p,p'-dihalodiphenyl sulfone of Formula III, above, in solution in an anhydrous dipolar aprotic solvent, preferably dimethylsulfoxide or tetrahydrothiophene 1,1-dioxide, at elevated temperatures.

P,p'-dihalodiphenyl sulfones suitable for making the condensation polymers of the present invention are commercially available products.

Bisphenols suitable for making the alkali metal bisphenates of Formula III, above, are obtained by condensation of the corresponding carboxyl-substituted ketone or aldehyde with phenol under acidic conditions in known manner according to the equation

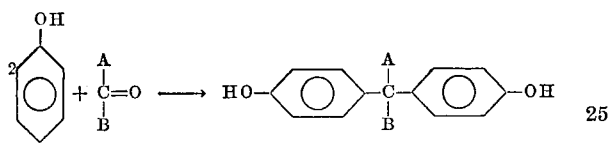

wherein A and B have the afore-stated meanings. The bisphenols thus obtained are readily converted into their alkali metal salts by contacting them with an alkali metal hydroxide.

Alkali metal bisphenates of the Formula IV, above, are prepared in the same manner.

Condensation polymerization of the dihalodiphenyl sulfone with the alkali metal bisphenate is carried out in a dipolar aprotic solvent, as above stated. The reaction mixture must be substantially anhydrous, otherwise it becomes impossible to obtain polymeric product of high molecular weight. The dihalodiphenyl sulfone and alkali metal bisphenate, or mixture of alkali metal bisphenates, are employed in substantially equimolar amounts. Presence of either reactant in the reaction mixture in amount in excess of that required for forming the desired condensation polymer tends to substantially reduce molecular weight of the product. The molecular weight of the condensation product may, if desired, be regulated by addition of chain terminators, as for example, sodium phenate or methyl chloride.

The condensation polymerization is ordinarily carried out at elevated temperature in the range of from about 100° C. to the atmospheric pressure reflux temperature of the reaction mixture. Higher polymerization temperatures may be employed, if desired, if the reaction is carried out under superatmospheric pressures. The condensation reaction is carried out under exclusion of atmospheric air, preferably under a nitrogen blanket.

The condensation product is generally obtained as a viscous solution in the reaction solvent, from which it may be recovered using conventional procedures such as, e.g., precipitation by addition of non-solvent therefor such as methanol followed by filtration, or by evaporation of the solvent therefrom. The product thus obtained may be purified as, e.g., by washing with warm water or with suitable solvents, as for example methanol. In any event, product recovery and purification methods follow conventional procedures.

DESCRIPTION OF PREFERRED EMBODIMENTS

With reference to the alkali metal bisphenates of Formula III, above, Me is preferably sodium or potassium, A is preferably alkyl, and B is a —$C_xH_{2x}$—COOMe group wherein x is an integer of from 2 to 6, or more preferably yet, from 2 to 4. Exemplary alkali metal bisphenates of the Formula III, above, include the following

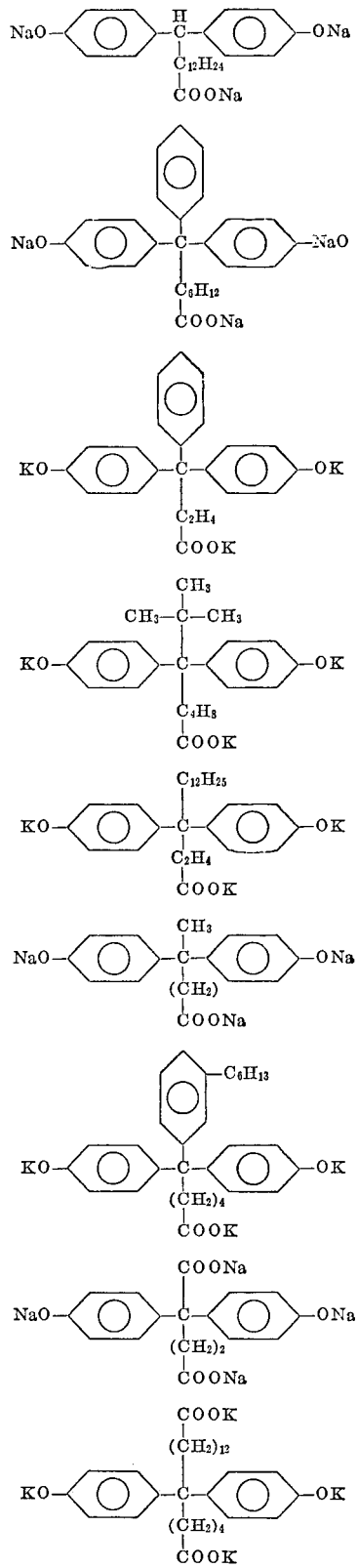

With respect to alkali metal bisphenates of Formula IV, above, Me is preferably sodium or potassium and D and E are preferably both alkyl groups and, more preferably yet, alkyl groups, straight chain or branched, having from 1 to 6 carbon atoms. An alkali metal bisphenate of the Formula IV, above, wherein D and E are both methyl groups is a specific example of a preferred embodiment.

Suitable alkali metal bisphenates in accordance with Formula IV, above, include the following.

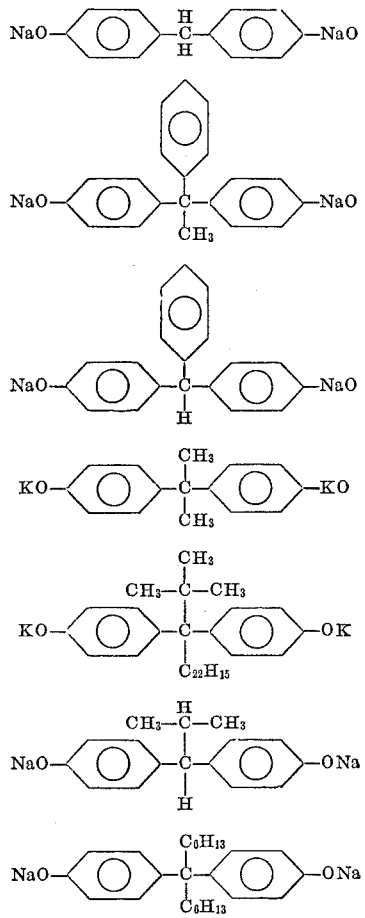

Polymeric condensation products of the present invention obtained by condensation of p,p'-dihalodiphenyl sulfone of Formula II, above, solely with carboxyl-containing alkali metal bisphenate of the Formula III, above, have excellent resistance to attack by solvents and to environmental stress cracking when contacted with solvents. That resistance is believed to be due to the presence of the $-C_xH_{2x}-COOMe$ groups in the molecule. These products although processable by methods usually employed for fabricating thermoplastic materials, tend to have very high melt indexes. Thermoplastic fabricating properties of condensation polymers of the present invention are improved by inclusion therein of carboxyl-free bisphenol moities derived from alkali metal bisphenates of Formula IV, above, in amounts such that the moities derived from bisphenate of Formula III, above, amount to at least 10 mol percent, based on the total amount of bisphenate-derived moieties in the polymer product. Polymer products containing lesser amounts of moieties derived from bisphenate of Formula III, above, do not have materially increased resistance to attack by solvents and environmental stress cracking, although they have all of the advantageous properties of known poly(ether-sulfones). Polymer products containing more than about 80 mol percent of carboxyl-containing moieties derived from alkali metal bisphenates of Formula III, above, based on the total amount of bisphenate-derived moieties, are often difficult to fabricate using conventional methods. For the above reasons it is preferred to make the condensation products of the present invention using a mixture of alkali metal bisphenates of Formulas III and IV, above, wherein the alkali metal bisphenate of Formula III, above, is present in amount of from 10 to 70 mol percent, and, more preferably, in amount of from 20 to 50 mol percent, based on the combined bisphenates in said mixture.

The following examples illustrate preferred embodiments of the present invention and set forth the best mode contemplated for its practice.

Environmental stress cracking, as used herein and as conventionally understood, refers to macroscopic internal or external cracks caused by tensile stresses less than the short-time mechanical strength of the polymer when it is subjected to the presence of organic solvents wherein ordinarily, but not necessarily, the polymer itself is insoluble. Thus, it may be a purely physical occurrence involving no chemical degradation or alteration of the polymer, but it may also involve some swelling or softening thereof.

Example 1

An electrically heated stainless steel reactor equipped with stirrer, gas inlet tubes and a Dean-Stark tube connected to a condenser was charged with 57.26 grams (0.2 mol) of 4,4-bis-(p-hydroxyphenyl) pentanoic acid (twice recrystallized from ethyl acetate) and 45.66 grams (0.2 mol) of bisphenol A. The reactor was closed, flushed with nitrogen and 56.1 grams (1 mol) of aqueous potassium hydroxide was added as a 0.6 g./ml. aqueous solution, followed by 250 ml. of dimethylsulfoxide and 240 ml. toluene. Agitation was started and reactor contents were heated to about 108° C., at which temperature a water/toluene azeotropic mixture began to distill off and accumulated in the Dean-Stark receiver. After about 3 to 4 hours the water had been removed and the toluene was distilled off by ultimately raising the reaction temperature to 135° C. Reactor contents were maintained under a nitrogen blanket throughout the reaction. Reactor contents were allowed to cool to room temperature and 114.88 grams (0.4 mol) of bis-(4-chlorophenyl)sulfone was added as a warm solution in 250 ml. dimethylsulfoxide. Reactor contents were agitated, heated to 135° C. and maintained at that temperature for 24 hours. Reactor and content were then allowed to cool to room temperature, the reactor was opened and found to contain a viscous solution from which the polymer product was precipitated by vigorous agitation with 2 liters of methanol in a one-gallon Waring Blendor. The precipitated solid polymer was filtered through a sintered glass funnel under vacuum, suspended in two liters of methanol and filtered again. It was then once washed with 1 liter of boiling water, followed by washing with methanol and drying under vacuum at 100° C. overnight, and, finally at 150° C. for four hours. There was thus obtained a condensation polymer product wherein the moiety obtained from the carboxyl-containing alkali metal bisphenate amounted to about 50 mol percent of the total amount of alkali metal bisphenate-derived moieties.

Example 2

The procedure of Example 1 was repeated, using 28.62 grams (0.1 mol) 4,4-bis(p-hydroxyphenyl) pentanoic acid, 68.50 (0.3 mol) bisphenol A, 50.50 grams (0.9 mol) of potassium hydroxide and 114.88 grams (0.4 mol) of bis-(4,chlorophenyl)sulfone. The product thus obtained contained about 25 mol percent of carboxyl-containing bisphenate-derived moieties, based on the total amount of bisphenate-derived moieties. The product had a high load melt index, determined by ASTM D–1238 (21,600 grams weight) of 0.35.

Solubility of poly(ether-sulfones) of the present invention in various solvents and their resistance to environmental stress cracking were determined by the following methods.

Solubility: A powdered sample of the polymer was treated in a test tube with the solvent at temperatures to the boiling point of the solvent. The polymers being insoluble in methanol, formation of precipitate upon methanol addition was taken as indication of solubility.

Environmental stress cracking: About 60 mil plaques of the polymers were formed by compression molding at 300 to 320° C. From these plaques were cut strips of about 0.5 by 4 inches. These strips were arched to about 120° angle, a drop of solvent was placed at the arch at room temperature and the sample was observed for appearance of cracks.

Results of solubility and environmental stress cracking tests are summarized in Table 1 below.

TABLE I

| Solvent | Solubility parameter | Standard[1] SOL[3] | Standard[1] SCR[4] | Invention product[2] SOL | Invention product[2] SCR |
|---|---|---|---|---|---|
| Benzonitrile | 8.4 | s | g | i | c |
| 1-butyl acetate | 8.5 | i | c | i | g |
| Ethyl acrylate | 8.6 | i | | i | |
| Piperidine | 8.7 | i | | i | |
| p-Chlorotoluene | 8.8 | s | c | i | g |
| Toluene | 8.9 | i | c | i | g |
| 1,2-dichloropropene | 9.0 | s | c | i | g |
| Cis-1,2-dichloroethylene | 9.1 | s | | i | |
| 2-methylcyclohexanone | 9.3 | s | | i | |
| Benzaldehyde | 9.4 | s | g | s | c |
| Chlorobenzene | 9.5 | s | c | i | g |
| 1,1,2-trichloroethane | 9.6 | s | c | i | c |
| 1,1,2,2-tetrachloroethane | 9.7 | s | g | i | c |
| Ethylene dichloride | 9.8 | s | g | i | g |
| Cyclohexanone | 9.9 | s | c | i | c |
| Nitrobenzene | 10.0 | s | g | i | c |
| 1,2-dibromoethylene | 10.1 | s | | | |
| Methyl iodide | 10.2 | s | c | i | c |
| Aniline | 10.3 | s | g | i | c |
| 1,2-dibromoethane | 10.4 | s | g | i | c |
| Hexamethylphosphoramide | 10.5 | s | c | s | g |
| Methyl salicylate | 10.6 | s | c | i | g |
| Pyridine | 10.7 | s | c | i | c |
| N,N-dimethylacetamide | 10.8 | i | c | i | c |
| Dimethyl malonate | 11.0 | i | c | i | c |
| Nitroethane | 11.1 | i | | i | |
| 2-furaldehyde | 11.2 | s | c | i | c |
| N-methyl pyrrolidone | 11.3 | s | | s | |
| Cyclohexanol | 11.4 | i | | i | g |
| 1,5-pentanediol | 11.5 | i | g | i | g |
| 1,3-butanediol | 11.6 | i | | s | |
| Diiodomethane | 11.8 | i | c | i | g |
| Acetonitrile | 11.9 | i | c | i | c |
| Dimethyl sulfoxide | 12.0 | s | c | s | c |
| Diethylene glycol | 12.1 | i | g | s | g |
| Ethylene chlorohydrine | 12.2 | i | | s | |
| Dimethyl phosphite | 12.5 | i | c | i | c |
| Chloroacetonitrile | 12.6 | i | c | i | c |
| Ethyl alcohol | 12.7 | i | | i | |
| Propiolactone | 13.3 | i | c | i | c |
| Dimethyl sulfone | 14.5 | i | | i | |
| Formamide | 19.2 | i | g | i | g |

[1] Poly(ether-sulfone) which is the eqimolar condesnsation product of p,p'-dihalodiphenyl sulfone and Bisphenol A.
[2] Poly(ether-sulfone) invention product which is condensation product of 1 mol p,p'-dihalodiphenyl sulfone with 0.5 mol of Bisphenol A and 0.5 mol of 2,2-bis(p-hydroxy phenyl) pentanoic acid.
[3] Solubility.
[4] Stress-crack resistance.

NOTE.—In the above table, i denotes insoluble, s denotes soluble, c denotes cracking, g denotes good resistance to stress cracking.

COMPARATIVE EXPERIMENT

Two mols of phenol were condensed with 1 mol of pyravic acid,

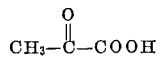

to form 2,2-bis(p-hydroxyphenyl) propionic acid. The acid was converted to the potassium salt which, following the procedure of Example 1, was condensed with bis(4-chlorophenyl) sulfone to give a polysulfone composed of repeating units of the formula

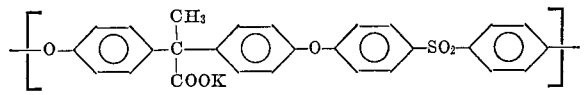

The polymer was compression molded at 300° C. into a 20 mil thick plaque. When a 0.5 by 4 inch strip of that plaque was arched into a 120° angle and contacted with a drop of chlorobenzene, it cracked instantaneously.

Comparative tensile properties were determined on a commercial poly(ether-sulfone) composed of recurring units of Formula I, above, having a Melt Index of 1.0 at 300° C. (determined by the method of ASTM D-1238), the condensation product of about equimolar amounts of p,p'-dihalodiphenyl sulfone with Bisphenol A (standard), and on poly(ether-sulfones) in accordance with the present invention which are condensation products of 1 mol of p,p'-dihalodiphenyl sulfone with 0.5 mol of Bisphenol A, and 0.5 mol of 2,2'-bis-p-hydroxyphenyl pentanoic acid (Polymer A), and of 1 mol of p,p'-dihalodiphenyl sulfone with 0.75 mol of Bisphenol A and 0.25 mol of 2,2-bis(p-hydroxyphenyl) pentanoic acid (Polymer B). Test method employed for determination of tensile properties was that of ASTM D-1708. Results are summarized in Table II below.

TABLE II.—COMPARATIVE TENSILE PROPERTIES

| Sample | Tensile strength, p.s.i. | | Percent elongation | |
|---|---|---|---|---|
| | Yield | Ultimate | Yield | Ultimate |
| Standard | 10,344 | 7.979 | 6.9 | 56.6 |
| Polymer: | | | | |
| A | 8,137 | 8.565 | 12.3 | 58.7 |
| B | 10,442 | 9.128 | 8.7 | 21.7 |

When other alkali metal bisphenate, according to Formula III and IV, above, are condensed with p,p'-dihalodiphenyl sulfone of Formula II, above, in accordance with the requirements of the present invention, similar results are obtained, that is to say, thermoplastic polymeric condensation products are formed having good resistance to attack by solvents and good resistance to environmental stress-cracking.

The thermoplastic aromatic poly(ether-sulfone) products of the present invention can be fabricated using methods conventionally employed for forming thermoplastic materials such as extrusion, injection molding, blow molding and thermoforming. Products made therefrom are eminently suitable for applications where their unusual combination of properties, namely, strength at high temperatures, resistance to chemical attack, especially to attack by solvents, and resistance to environmental stress-cracking, combined with good electrical insulating properties may be employed to advantage. Illustrative applications include films, sheets, solid molded objects and coatings. The products of the present invention are especially suitable for making mounting boards for electric and electronic assemblies, electrical insulators and the like, especially if intended for use in high temperature environments. The excellent properties of the invention products may, for certain purposes, if desired, be improved by incorporating therein inert fillers such as asbestos, glass, metal powders, diamond powder, abrasive powders, graphite, and the like. Such filler generally may be incorporated for the purpose of improving such properties as stiffness, thermal conductivity, electrical insulating properties and hardness.

Since various changes and modifications may be made in the invention without departing from the spirit and essential characteristics thereof, it is intended that all matter contained in the above description shall be interpreted as illustrative only, the invention being limited only by the scope of the appended claims.

I claim:

1. A thermoplastic polymeric condensation product of about equimolar amounts of p,p'-dihalodiphenyl sulfone of the formula

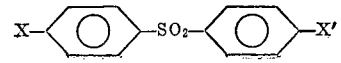

wherein X and X' are halogens selected from the group consisting of chlorine, bromine and iodine, with
(a) an alkali metal bisphenate of the formula

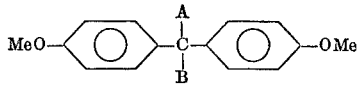

wherein Me is an alkali metal, and wherein A and B, which may be the same or different, are selected from the group consisting of
(i) H;
(ii) alkyl, straight chain or branched, having from 1 to 12 carbon atoms;
(iii) phenyl;
(iv) alkyl-substituted phenyl wherein the alkyl substituents may have from 1 to 6 carbon atoms; and
(v) a group of the formula $$-C_xH_{2x}-COOMe$$

wherein x is an integer of from 1 to 12 and Me is an alkali metal;
with the proviso that at least one of A and B is a group of the formula $C_xH_{2x}$—COOMe wherein x and Me have the afore-stated meanings
or with
(b) a mixture of said alkali metal bisphenate with an alkali metal bisphenate of the formula

whrein D and E, which may be the same or different, are selected from the group consisting of
(i) H;
(ii) alkyl, straight chain or branched, having from 1 to 12 carbon atoms;
(iii) phenyl; and
(iv) alkyl-substituted phenyl wherein the alkyl substituents may have from 1 to 6 carbon atoms;
with the proviso that the alkali bisphenate of the formula

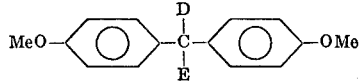

is present in said mixture in amount of at least 10 mol percent, based on the mols in said mixture.

2. Polymeric condensation products according to claim 1 of about equimolar amounts of p,p'-dihalodiphenyl sulfone of the formula

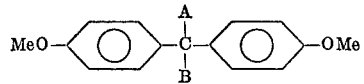

wherein X and X' are halogens selected from the group consisting of chlorine, bromine and iodine, with a mixture of
(a) an alkali metal bisphenate of the formula

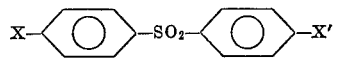

wherein Me is an alkali metal, and wherein A and B, which may be the same or different, are selected from the group consisting of
(i) H;
(ii) alkyl, straight chain or branched, having from 1 to 12 carbon atoms;
(iii) phenyl;
(iv) alkyl-substituted phenyl wherein the alkyl substituents may have from 1 to 6 carbon atoms;

and
(v) a group of the formula $$-C_xH_{2x}-COOMe$$

wherein x is an integer of from 1 to 12 and Me is an alkali metal;
with the proviso that at least one of A and B is a group of the formula $C_xH_{2x}$—COOMe wherein x and Me have the afore-stated meanings, and
(b) an alkali metal bisphenate of the formula

wherein D and E, which may be the same or different, are selected from the group consisting of
(i) H;
(ii) alkyl, straight chain or branched, having from 1 to 12 carbon atoms;
(iii) phenyl; and
(iv) alkyl-substituted phenyl wherein the alkyl substituents may have from 1 to 6 carbon atoms;
in which mixture the alkali metal bisphenate of the formula

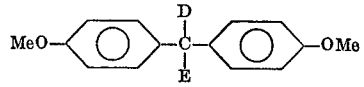

is present in amount of between 10 and 80 mol percent, based on the mols in said mixture.

3. Polymeric condensation products according to claim 2 wherein in said alkali metal bisphenate of the formula

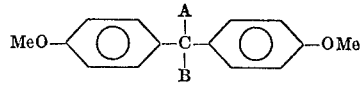

A and B are alkyl, straight chain or branched, having from 1 to 6 carbon atoms, or a group of the formula —$C_xH_{2x}$—COOMe wherein x is an integer of from 2 to 6 and Me is sodium or potassium, and wherein in said alkali metal bisphenate of the formula

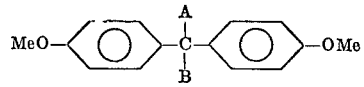

D and E are both alkyl groups, straight chain or branched, having from 1 to 6 carbon atoms.

4. Polymeric condensation products according to claim 3 wherein in said alkali metal bisphenate of the formula

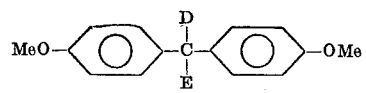

A is alkyl, straight chain or branched, having from 1 to 6 carbon atoms, B is a group of the formula $$-C_xH_{2x}-COOMEe$$

wherein x is an integer of from 2 to 4 and Me is sodium or potassium.

5. Polymeric condensation products according to claim 3 wherein in said mixture of alkali metal bisphenates of the formulas

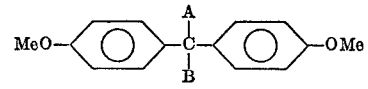

and

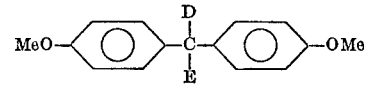

the alkali metal bisphenate of the formula

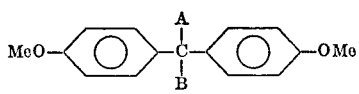

is present in amount of between 20 and 60 mol percent, based on the mols in said mixture.

6. Polymeric condensation products of claim 5 wherein A, D and E are all methyl groups.

7. Polymeric condensation products according to claim 1 of about equimolar amounts of p,p'-dihalodiphenyl sulfone of the formula

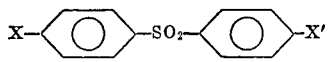

wherein X and X' are halogens selected from the group consisting of chlorine, bromine and iodine, with a mixture of (a) alkali metal bisphenate of the formula

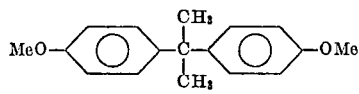

wherein Me is sodium or potassium, with (b) alkali metal bisphenate of the formula

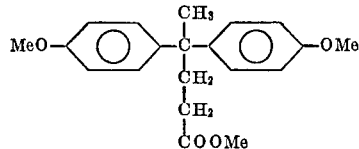

wherein Me is sodium or potassium, in which mixture the alkali metal bisphenate of the formula

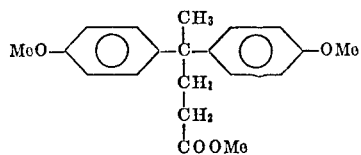

is present in amount of between 20 and 60 mol percent, based on the mols in said mixture.

References Cited
UNITED STATES PATENTS

| | | | |
|---|---|---|---|
| 3,332,909 | 7/1967 | Farnham et al. | 260—47 |
| 3,554,972 | 1/1971 | Cornell | 260—49 |
| 3,532,670 | 10/1970 | Schnell et al. | 260—49 |
| 3,647,751 | 3/1972 | Darsow | 260—49 |

WILLIAM H. SHORT, Primary Examiner

L. L. LEE, Assistant Examiner

U.S. Cl. X.R.

260—30.2, 30.6 R, 30.8 DS, 32.8 R, 33.4 R, 33.8 R, 37 R, 47 G